United States Patent
Grufman et al.

(10) Patent No.: US 11,547,041 B2
(45) Date of Patent: Jan. 10, 2023

(54) METHOD FOR DETECTING LIFTING OF A SELF-PROPELLED TOOL FROM THE GROUND

(71) Applicant: Husqvarna AB, Huskvarna (SE)

(72) Inventors: Stefan Grufman, Bankeryd (SE); Jonas Rangsjö, Linköping (SE); Fredrik Kallström, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 390 days.

(21) Appl. No.: 16/606,387

(22) PCT Filed: Apr. 12, 2018

(86) PCT No.: PCT/SE2018/050375
§ 371 (c)(1),
(2) Date: Oct. 18, 2019

(87) PCT Pub. No.: WO2018/194504
PCT Pub. Date: Oct. 25, 2018

(65) Prior Publication Data
US 2021/0289695 A1    Sep. 23, 2021

(30) Foreign Application Priority Data
Apr. 18, 2017   (SE) .................................. 1750451-5

(51) Int. Cl.
*A01D 34/00*   (2006.01)
*G05D 1/00*    (2006.01)
(Continued)

(52) U.S. Cl.
CPC ......... *A01D 34/008* (2013.01); *G05D 1/0055* (2013.01); *G05D 1/027* (2013.01);
(Continued)

(58) Field of Classification Search
CPC ............ A01D 34/008; A01D 2101/00; G05D 1/0055; G05D 1/027; G05D 1/0272; G05D 2201/0208
See application file for complete search history.

(56) References Cited

U.S. PATENT DOCUMENTS 6,338,013 B1    1/2002  Ruffner
8,438,695 B2 *  5/2013  Gilbert, Jr. .............. B60L 50/52
                                                    15/319

(Continued)

FOREIGN PATENT DOCUMENTS

EP      3056959 A1     8/2016
WO   2014027945 A1     2/2014

(Continued)

OTHER PUBLICATIONS

Swedish Search Report for Application No. 1750451-5 dated Dec. 14, 2017.

(Continued)

*Primary Examiner* — Jeff A Burke
*Assistant Examiner* — Mohamad O El Sayah
(74) *Attorney, Agent, or Firm* — Burr & Forman LLP

(57) ABSTRACT

The present disclosure relates to a self-propelled robotic tool (1) and a method in a self-propelled robotic tool (1), being used to detecting lifting of the self-propelled robotic device from the ground. The method includes collecting (21) driving data (31) related to the driving of a wheel (5), collecting (23) measured inertia data from an inertial measurement unit (13), IMU, in the self-propelled robotic tool, determining (25), using an estimation function (33), a residual parameter corresponding to a differential between said measured inertia data and estimated inertia data resulting from said driving data being input to said estimation function, and determining a lifting condition based on the residual parameter.

5 Claims, 3 Drawing Sheets

(51) Int. Cl.
*G05D 1/02* (2020.01)
*A01D 101/00* (2006.01)

(52) U.S. Cl.
CPC ....... *G05D 1/0272* (2013.01); *A01D 2101/00* (2013.01); *G05D 2201/0208* (2013.01)

(56) References Cited

U.S. PATENT DOCUMENTS

| | | |
|---|---|---|
| 9,908,432 B2 * | 3/2018 | Park .................. B60G 17/016 |
| 2011/0153081 A1 | 6/2011 | Romanov et al. |
| 2011/0202175 A1 | 8/2011 | Romanov et al. |
| 2014/0031980 A1 | 1/2014 | Gutmann et al. |
| 2014/0188325 A1 | 7/2014 | Johnson et al. |
| 2015/0197012 A1 * | 7/2015 | Schnittman ............ G05D 1/027 |
| | | 700/250 |
| 2016/0008982 A1 | 1/2016 | Artes et al. |

FOREIGN PATENT DOCUMENTS

| | | |
|---|---|---|
| WO | 2016103070 A1 | 6/2016 |
| WO | 2016150510 A1 | 9/2016 |

OTHER PUBLICATIONS

International Search Report and Written Opinion for International Application No. PCT/SE2018/050375 dated Jun. 29, 2018.
International Preliminary Report on Patentability for International Application No. PCT/SE2018/050375 dated Oct. 22, 2019.

* cited by examiner

METHOD FOR DETECTING LIFTING OF A SELF-PROPELLED TOOL FROM THE GROUND

FIELD OF THE INVENTION

The present disclosure relates to a method in a self-propelled robotic tool, comprising at least one driving wheel, wherein the method detects lifting of the self-propelled robotic device from the ground.

The disclosure further relates to a self-propelled robotic tool configured to carry out this method.

TECHNICAL BACKGROUND

Self-propelled robotic tools such as robotic lawnmowers have become widely used. One function desired in such tools is the detection of the tool being lifted from the ground. For instance, this function may be used to prevent theft. If an unauthorized person tries to remove a robotic lawnmower from the lawn where it is intended to operate, an alarm may sound and the lawnmower may be disabled until authorization takes place, for instance with a code. Disabling the lawnmower if lifted may also be a desired function to prevent injury, as rotating knives on the bottom side of the lawnmower may be very sharp.

In known self-propelled robotic tools, a common way to provide a lifting detection function is to provide sensors in between an outer housing of the robotic tool and its inner chassis. Then, if someone lifts the robotic tool by grabbing the outer housing, the sensors will indicate that the chassis is suspended from the housing, and lifting may be indicated. Such sensors may comprise permanent magnets and Hall sensors indicating movement of said permanent magnets.

A general problem associated with self-propelled robotic tools is how to reduce the number of components used in the tool and consequently the cost of the robotic tool.

SUMMARY OF THE INVENTION

One object of the present disclosure is therefore to provide a lifting indication method in a self-propelled robotic tool and a self-propelled robotic tool with a lifting indication function where the robotic tool can be produced at a lower cost. This object is achieved by means of a method as defined herein.

More specifically, in a method of the initially mentioned kind, driving data related to the driving of the at least one driving wheel is collected together with measured inertia data from an inertial measurement unit, IMU, in the self-propelled robotic tool. It is determined a residual parameter by means of an estimation function, which parameter corresponds to a differential between said measured inertia data and estimated inertia data resulting from said driving data being input to said estimation function or alternatively between said driving data and estimated driving data resulting from said measured inertia data being input to an inverse of said estimation function. Based on this residual parameter, a lifting condition is determined.

This allows the detecting of a lifting condition without the use of dedicated lifting sensors. The IMU is used also for other purposes such as navigation, and is therefore in any case provided in the self-propelled robotic tools. The lifting detection may therefore be provided by the addition of software routines in control systems already present in the robotic tool. Therefore, costs can be lowered since some sensors are eliminated, while the robotic tool nevertheless is capable of carrying out lifting detection.

The IMU may include a device in a group comprising gyroscopes and accelerometers. Such sensors may be used in a robotic tool for other reasons and their use also for detecting lifting need therefore not increase costs to any greater extent.

The driving data may correspond to electric motor driving currents or voltages, which drive the robotic tool wheels. Such parameters may be readily available from motor driving interfaces. As an alternative, driving data may correspond to detected rotational movement of a wheel. Such data may be obtained for instance with an optical sensor.

When the self-propelled robotic tool is stationary, a dither current may be applied to the electric motor, such that an inertia data response is obtained when said at least one driving wheel is connected to the ground. This facilitates lifting detection in a case where the IMU would otherwise give only a small or no output.

Such a dither current may be applied to the electric motor also when the self-propelled robotic tool is moving at a constant pace.

If two or more wheels are driven by electric motors the driving data may correspond to the electric motor driving currents or voltages of said those wheels. Counteracting driving signals may be applied to the electric motors, such that the self-propelled robotic tool remains stationary while the driving wheels are connected to the ground, and wherein spinning of said driving wheels is determined as a lifting condition. This provides an alternative way of detecting lifting of a stationary robotic tool.

Different driving signals may be applied to different electric motors also when the robotic tool is moving to produce more IMU responses and facilitate lifting detection also when the self-propelled robotic tool is moving at a constant pace.

Slope detection and friction parameters may be input to the estimation function to make it more precise.

The present disclosure also considers a self-propelled robotic tool comprising a lifting detection device, configured to detect lifting of the self-propelled lifting device as described above. Generally, the robotic tool the includes corresponding devices and is configured to carry out the steps of the above-defined method.

DETAILED DESCRIPTION

Figure 1:
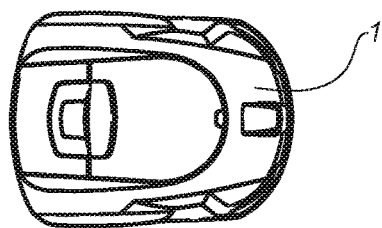
FIG. 1 shows a top view of a self-propelled robotic tool in the form of a lawnmower.

Self-propelled robotic tools, for instance in the form of robotic lawnmowers 1 as shown in FIG. 1, have become widely used. However, the present disclosure may also be useful in connection with robotic tools configured as robotic vacuum cleaners, golf ball collecting tools or any other type of robotic tool that operates over a working area. Typically, such robotic tools intermittently connect to a charging station (not shown).

The present disclosure relates to detection of lifting of a self-propelled robotic tool from the ground or from a floor. Lifting detection is commonly used in robotic lawnmowers, for instance to prevent theft, but this function could be useful also in self-propelled robotic tools of other types. In robotic lawnmowers, another reason to provide this function is that rotating knives on the bottom side of the lawnmower may be very sharp, and could injure an unauthorized person, for instance a child lifting the lawnmower, or turning it upside-down. If the robotic tool is lifted, an alarm may sound and the self-propelled robotic tool may become disabled.

A known way to provide lifting detection in a self-propelled robotic tool is to arrange sensors such as Hall sensors in between an outer housing of the robotic tool and an inner chassis. Then, if the robotic tool is lifted in the outer housing, such sensors may indicate the chassis being suspended from the housing rather than the housing resting on the chassis, thereby indicating lifting.

The present disclosure describes an arrangement that enables replacing such sensors and providing lifting detection by other means. This lowers costs and allows a greater freedom when designing connections between chassis and outer housing. Additionally problems arising when sensing arrangements of the known type or associated electronics becomes contaminated with dirt or grass or the like may be obviated.

The lifting detection of the present disclosure may be realized using components that are already present in a self-propelled robotic tool, and that are used in a new way.

Figure 2:
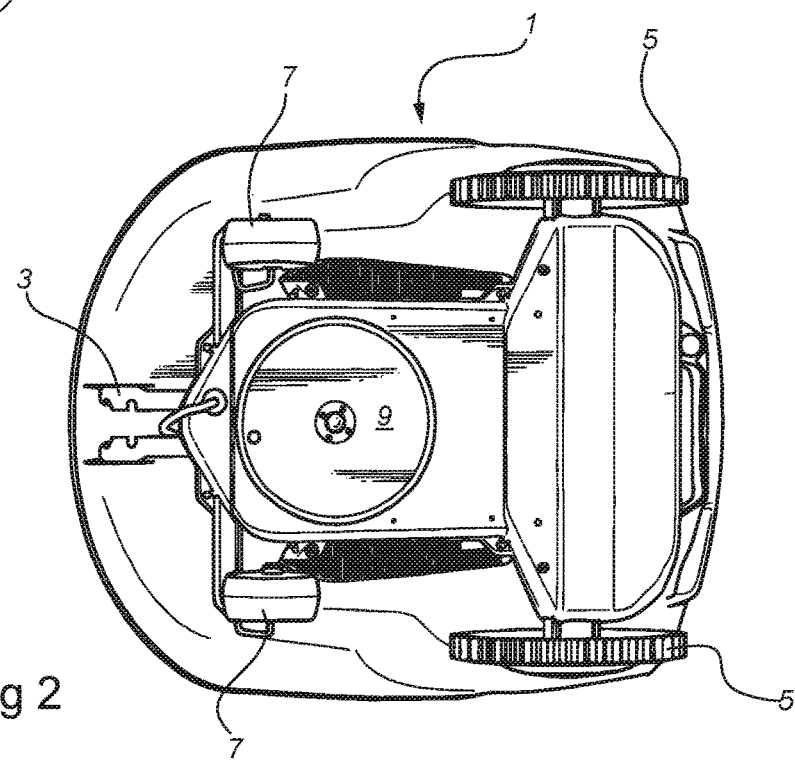
FIG. 2 shows the bottom side of the robotic tool of FIG. 1.

To illustrate the context where the functions of the present disclosure are used, FIG. 2 shows the bottom side of a robotic tool 1. Typically, the robotic tool has a connector arrangement 3, that allows the robotic tool 1 to intermittently connect to a charging station. In the illustrated case two driving wheels 5 are located at the rear end of the robotic tool and two swiveling wheels 7 are located in the front. The driving wheels 5 may typically each be individually driven by an electric motor, while the swiveling wheels 7 may be undriven. However, other configurations are possible, and may be preferred in many cases. For instance, a four-wheel drive configuration with a driven wheel in each corner of the robotic tool may be considered. A blade 9 for mowing grass is also shown.

Figure 3:
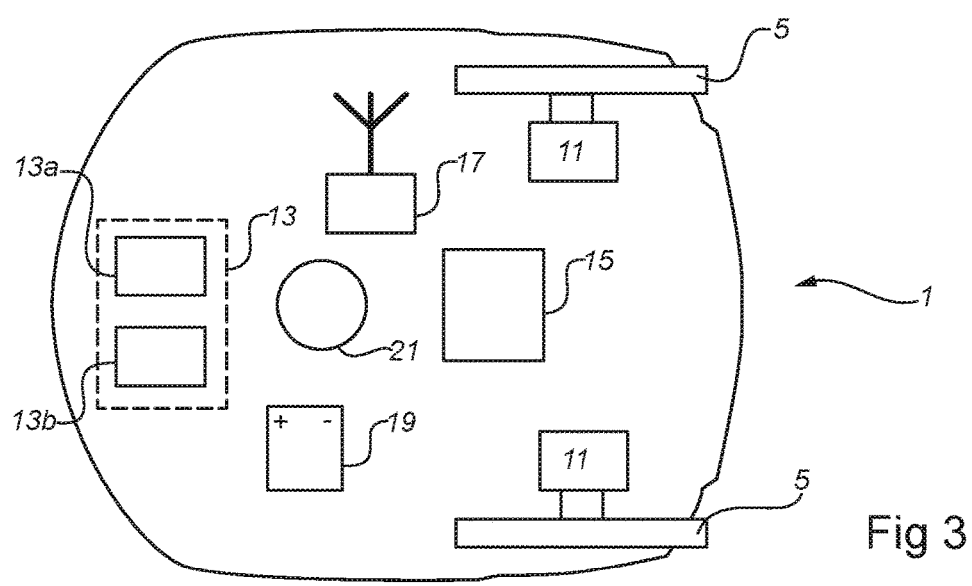
FIG. 3 illustrates functional units in such a robotic tool.

FIG. 3 illustrates, very schematically, functional units in a self-propelled robotic tool 1. In addition to the mentioned driving wheels 5, typically driven by individual electric motors 11, such as brushless permanent magnet motors, the robotic tool may include an inertia measurement unit, IMU, 13 including for instance accelerometers 13a and/or gyroscopes 13b as will be discussed further.

Additionally, the robotic tool includes a processing unit 15 such as a CPU or the like, and optionally a communications interface 17 which allows the robotic tool to communicate with other units, such as a central charging station. Further, an accumulator 19 may be included, as well as a cutting motor 11, for instance for driving a mowing blade/knife.

The present disclosure uses functions provided for other reasons in the self-propelled robotic tool also for detecting a lifting condition. Thereby the complexity and cost can be reduced as dedicated lifting sensors can be made redundant.

Figure 4:
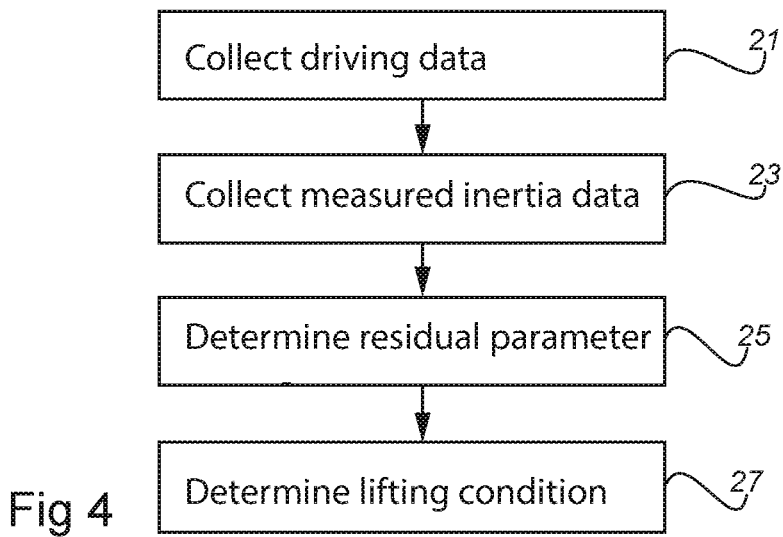
FIG. 4 illustrates a flow chart of a method according to the present disclosure.

Generally, the present disclosure relies on that driving of the wheels, particularly accelerations and decelerations will result in corresponding responses from an inertia measurement unit 13 (cf. FIG. 3) as long as the driving wheels rest on the ground and carry at least some of the weight of the self-propelled robotic tool. When the robotic tool is lifted, partially or wholly, from the ground or floor, this relationship between driving of the wheels and the inertia response becomes more or less disconnected. That condition, if detected, can be used to detect a lifting condition and taking appropriate action, for instance by sounding an alarm and/or disabling the robotic tool to a greater or lesser extent. A general flow chart of a method according to the present disclosure is illustrated in FIG. 4.

Generally, the detecting method for detecting lifting of the self-propelled robotic device from the ground involves comparing movement of at least one driving wheel 5 with measured inertia data from an inertial measurement unit 13. The method includes the following steps. Driving data is collected 21 related to the driving of the at least one driving wheel, and measured inertia data is collected 23 from an inertial measurement unit 13, IMU.

The method then uses an estimation function that in a first alternative determines, for a given wheel movement, which inertia measurement unit response would be expected. For instance, if the robotic tool being standing still begins moving by turning the wheels this will be detected as an acceleration by acceleration sensors in the IMU. Likewise, if the robotic tool turns, this will be detected by acceleration sensors and/or gyroscopes in the IMU 13. There may be determined 25 a residual parameter corresponding to a difference between the measured inertia data and estimated inertia data resulting from the driving data being input to said estimation function. If this residual parameter is small, it is most likely that the robotic tool moves freely on the ground or floor. However, if the residual parameter is large, this may be the result of the wheels spinning in the air, and consequently the IMU 13 not giving any corresponding response. The latter may indicate that the robotic tool has been lifted from the ground or floor, such that a lifting condition may be detected 27. This alternative is illustrated also in FIG. 5 showing a block diagram of a lifting detection arrangement.

Figure 5:
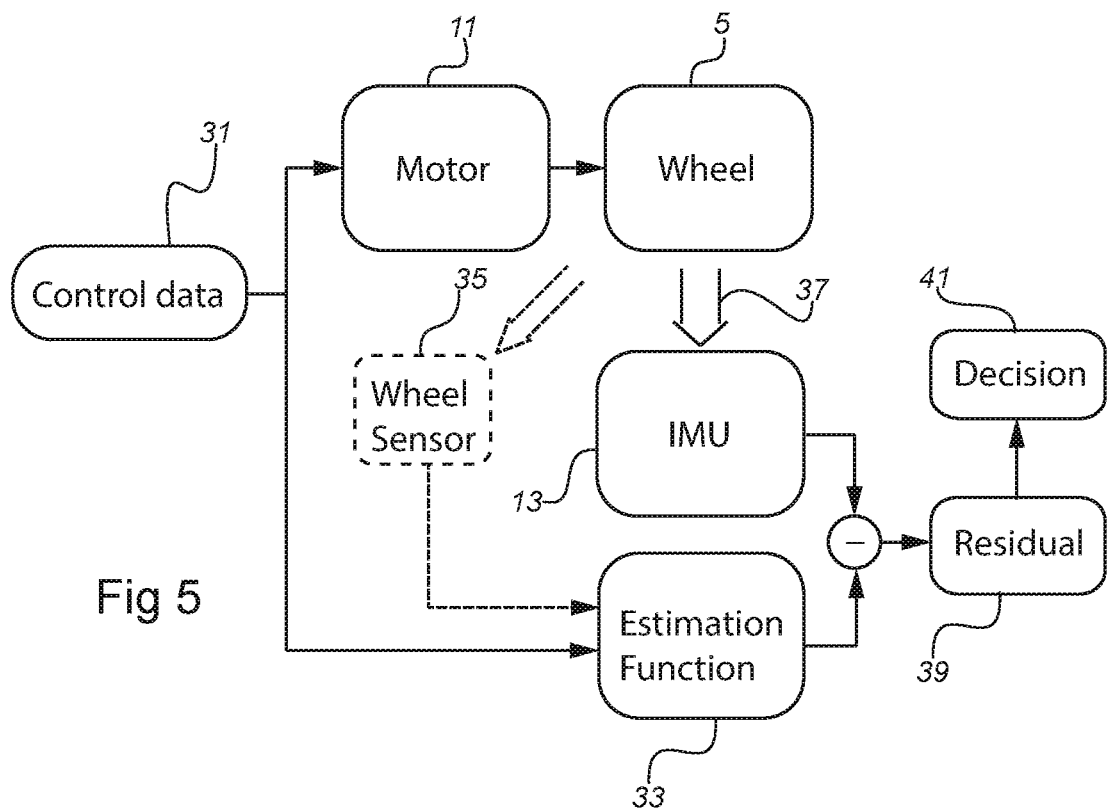
FIG. 5 illustrates a first block diagram of a lifting detection arrangement.

As shown in FIG. 5, driving data 31 is produced to control a motor 11 driving a wheel 5. Such control data may typically be produced in a processing unit 15 (cf. FIG. 3) to make the robotic tool move in a desired pattern. This driving data is also inputted to an estimation function 33. As an alternative to inputting the driving data, it is possible to detect the actual resulting rotation of the wheel 5 using a wheel sensor 35, which may for instance be an optical sensor. In any case, data with a very strong correlation to the rotation of the wheel is input to the estimation function 33.

As long as the robotic tool moves freely on the ground or floor, the turning of the wheel may generate a response 37 in the IMU 13. The corresponding model is relatively simple and deterministic. With knowledge of how the wheel or wheels turn, the estimation function 33 provides an estimation of the expected response from the IMU 13. This estimated response is compared to the actual response, and the difference therebetween is provided as a residual 39 that may be a single value or a vector depending on how many different IMU parameters are extracted and estimated, and on how those are processed. The residual 39 may be compared to a threshold level to provide a decision 41 whether or not the robotic tool has been lifted. Other conceivable options exist for how the decision is made as the skilled person realizes, for instance the residual's variation over time may be used to make the determination whether the robotic tool has been lifted or not.

If it is determined that the robotic tool has been lifted, or that it is probable that the robotic tool has been lifted, different actions can be carried out, such as sounding an alarm or disabling the robotic tool in different ways.

Figure 6:
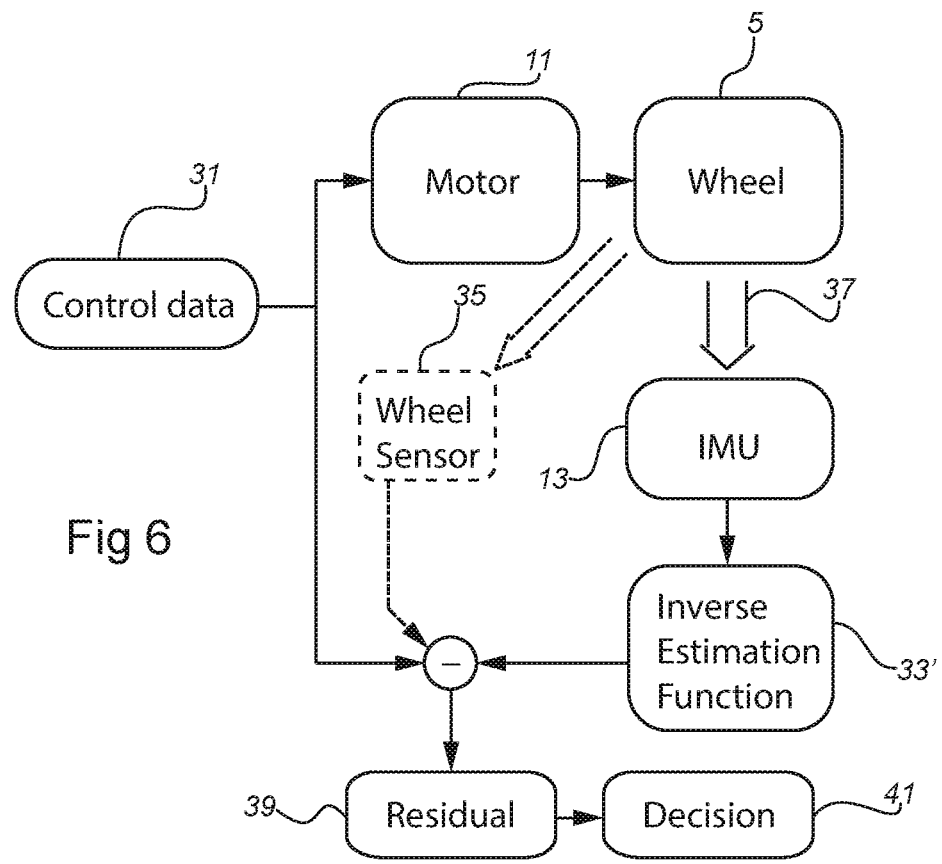
FIG. 6 illustrates a second, alternative block diagram of a lifting detection arrangement.

FIG. 6 illustrates an alternative version of the method, where instead the measured inertia data from the IMU 13 is input to an inverse 33' of the above estimation function. This results in estimated wheel movement i.e. from the inertia response it is estimated how the wheel or wheels of the robotic tool would have moved to produce this response. In this alternative embodiment, this estimated wheel movement data is compared to actual wheel movement data, which as described above can be determined from control data 31 or a wheel sensor 35 to provide a residual. A lifting condition can be determined in a similar way as described above using this residual.

As mentioned and with reference to FIG. 3, the IMU 13 may include accelerometers 13a and gyroscopes 13b. While gyroscopes 13b mainly detect turning of the robotic tool, it may be possible to use gyroscope data only, by inducing small turns as will be discussed. Accelerometers 13a could detect any movement of the robotic tool if capable of detecting any accelerations in a three-dimensional space. It should be noted that the IMU 13 will be used in many robotic tools to perform navigation etc., and the lifting detection of the present disclosure may be used with any available IMU data that contributes with improving the detection. Therefore, accelerometer and gyroscope data may be combined to verify that the robotic tool moves freely with its wheels resting on the ground or floor.

As mentioned, the driving data may correspond to electric motor driving currents or voltages, which drive the robotic tool wheels. Depending on the motor driving arrangement used, such data may be readily available from the processor unit, and may be collected with a simple software function. Typically, each wheel may be driven by a brushless permanent magnet motor, and driving arrangements may allow parameters corresponding to the amplitude and frequency of the applied currents or voltages to be readily accessed. If stepping motors are used, data corresponding to the rotation of a connected wheel may of course also be easily available.

As an alternative, driving data corresponding to a rotational movement of a wheel may of course also be detected by detecting the actual movement of the wheel using a dedicated sensor 35, which may for instance detect wheel movements optically.

Figure 7:
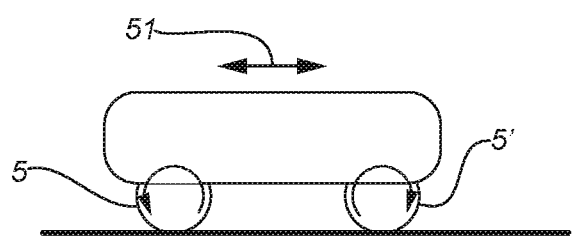
FIG. 7 illustrates methods for detecting lifting of a stationary robotic tool.

Special consideration may be made when the robotic tool is standing still. If this is the case, and the robotic tool is very slowly lifted from the ground, an algorithm may not necessarily detect the lifting, as the contact between the wheels and the ground does not cause any IMU response. One conceivable solution in this situation is to apply a small driving force to the wheels that is not intended to substantially move the robotic tool as a whole. This may be provided as a dither current that is applied to the electric motor. The result may be that the robotic tool while stationary performs a slight shaking motion 51, as indicated in FIG. 7. This shaking may, even if not visible, result in an inertia data response that verifies that the wheels are in contact with the ground or floor.

Such a dither current may also be applied to an electric motor when the robotic wheel moves at constant pace and in a straight line, when the IMU will normally give a small output. However, the lifting of a moving robotic tool without provoking a distinct, unexpected IMU response, typically a retardation, will most likely be an unusual event.

Another option when dealing with a situation where the self-propelled robotic tool is stationary, is to provide counteracting driving signals to the motors of the wheels typically in a four-wheel drive configuration. This option is also illustrated in FIG. 7 where rear wheels 5 are driven backwards while front wheels 5' are driven forwards. It should be noted that the wheels need not move in this situation, it is sufficient that a torque is applied to the wheels. As long as the driving wheels are connected to the ground they will remain still, and if the wheels begin to spin this may be determined as a lifting condition using a wheel sensor 35.

Applying slightly differing driving signals may also be used to determine a lifting condition when the self-propelled robotic tool moves with a constant pace in a similar way. Further, in a two-wheel driven configuration, differing driving signals may be used in another way when the robotic tool moves at constant pace and on a straight path. Varying the driving of the two driven wheels periodically and mutually out of phase will cause the robotic tool to zig-zag slightly. Even if the zig-zag component of the robotic tool's movement is so small that it is not visible, and does not cause any visible variation in a grass cutting pattern, the IMU may continuously be fed with directional changes, and absence of such changes may be interpreted as the robotic tool being lifted. Such an arrangement also makes lifting detection only using gyroscope data possible.

The estimation function 33 translating wheel movement data into predicted IMU data, or alternatively the inverse estimation function 33' translating IMU data into estimated corresponding wheel movement data, can be obtained in different ways typically by running the robotic tool and recording IMU data. The physical model used is rather simple, including a roughly known mass moving under the influence of the wheels.

Figure 8:
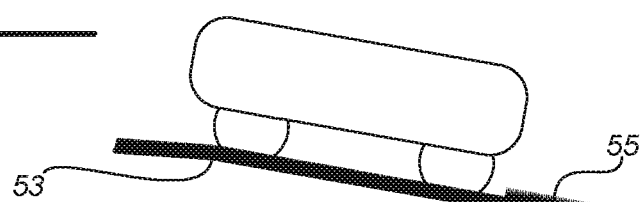
FIG. 8 illustrates changing conditions that can be input to an estimation function.

As illustrated in FIG. 8, properties of the environment the robotic tool 1 moves in may also be input into the estimation functions. The slope and friction that the robotic tool is subjected to when moving may change its behavior. It is therefore possible to input changes in slope 53 and friction 55, for instance from running in thicker grass, into the estimation functions. The estimation functions may therefore vary over time. In many cases, robotic tools for other reasons comprise slope and e.g. grass thickness sensing means that could be used to this end.

The estimation function as well as the functionality deciding based on a residual whether or not the robotic tool has been lifted can be software implemented. It would also be possible to employ machine learning technologies. For instance a neural network could be taught to detect lifting based on wheel driving and IMU data.

The present disclosure is not restricted to the above-described examples, and may be varied and altered in different ways within the scope of the appended claims.

The invention claimed is:

1. A method in a self-propelled robotic tool comprising at least one driving wheel, the method detecting lifting of the self-propelled robotic tool from the ground, the method comprising:
   collecting driving data related to the driving of said at least one driving wheel;
   collecting measured inertia data from an inertial measurement unit (IMU) in the self-propelled robotic tool;
   determining, via an estimation function, a residual parameter corresponding to a differential between said measured inertia data and estimated inertia data resulting from said driving data being input to said estimation function or between said driving data and estimated driving data resulting from said measured inertia data being input to an inverse of said estimation function; and determining a lifting condition based on said residual parameter;

wherein at least two wheels are driven by electric motors and said driving data corresponds to electric motor driving currents or voltages of said at least two wheels;

wherein, when the self-propelled robotic tool is stationary, counteracting driving signals are applied to the electric motors, such that the self-propelled robotic tool remains stationary while the driving wheels are connected to the ground, and wherein spinning of said driving wheels is determined as the lifting condition.

2. The method according to claim 1, wherein said IMU includes a device in a group comprising gyroscopes and accelerometers.

3. The method according to claim 1, wherein, when the self-propelled robotic tool is moving in a constant pace, a dither current is applied to the electric motor, such that an inertia data response is obtained when said at least one driving wheel is connected to the ground.

4. The method according to claim 1, wherein a slope detection parameter is input to said estimation function.

5. The method according to claim 1, wherein said driving data corresponds to a detected rotational movement of said at least one wheel.

* * * * *